(12) United States Patent
Carnesecca et al.

(10) Patent No.: US 12,147,573 B2
(45) Date of Patent: Nov. 19, 2024

(54) SENSITIVE DATA ATTRIBUTE TOKENIZATION SYSTEM

(71) Applicant: RevSpring, Inc., Livonia, MI (US)

(72) Inventors: Lino Etollo Carnesecca, Scottsdale, AZ (US); Shawn Michael Mox, Thornville, OH (US); Scott Andrew Astheimer, Eagleville, PA (US); Eric Edward Martin, Newark, OH (US); Cliff Lee Curtis, Honey Brook, PA (US); Jesse Alan Yeager, Warren, MI (US); Miguel Dawson, Westerville, OH (US)

(73) Assignee: REVSPRING, INC., Livonia, MI (US)

( * ) Notice: Subject to any disclaimer, the term of this patent is extended or adjusted under 35 U.S.C. 154(b) by 41 days.

(21) Appl. No.: 17/553,160

(22) Filed: Dec. 16, 2021

(65) Prior Publication Data

US 2023/0195932 A1    Jun. 22, 2023

(51) Int. Cl.
*G06F 21/60* (2013.01)
*G06F 21/62* (2013.01)
*G06F 16/21* (2019.01)

(52) U.S. Cl.
CPC ........ *G06F 21/6254* (2013.01); *G06F 21/608* (2013.01); *G06F 21/6209* (2013.01); *G06F 16/21* (2019.01)

(58) Field of Classification Search
CPC . G06F 21/6254; G06F 21/608; G06F 21/6209
See application file for complete search history.

(56) References Cited

U.S. PATENT DOCUMENTS

| | | | |
|---|---|---|---|
| 6,157,919 A * | 12/2000 | Cordery | G07B 17/0008 705/410 |
| 10,025,941 B1 * | 7/2018 | Griffin | G06F 21/6209 |
| 11,144,656 B1 * | 10/2021 | Banerjee | G06F 21/568 |
| 2010/0332484 A1 * | 12/2010 | Saito | G06F 21/6254 707/E17.008 |
| 2017/0093812 A1 * | 3/2017 | Schenk | H04L 63/20 |
| 2021/0226934 A1 * | 7/2021 | Barnett | H04L 63/0428 |
| 2021/0248268 A1 * | 8/2021 | Ardhanari | G16H 70/60 |
| 2021/0256149 A1 * | 8/2021 | Koduru | G06F 16/254 |

(Continued)

OTHER PUBLICATIONS

Gottlieb et al., "Temporary Relief for Debt Collectors: 11th Circuit Withholds Hunstein Mandate," The National Law Review, https://www.natlawreview.com/article/temporary-relief-debt-collectors-11th-circuit-withholds-hunstein-mandate, vol. X1, No. 188, 4 pages (Jul. 7, 2021).

*Primary Examiner* — Wasika Nipa
*Assistant Examiner* — Andrew Suh
(74) *Attorney, Agent, or Firm* — Merchant & Gould P.C.

(57) ABSTRACT

Protecting sensitive data from unauthorized disclosure is provided. For example, systems, methods, and computer readable storage devices are described that may be operable or configured to tokenize sensitive data attributes that may be included in a data file received from a client. Tokens that are anonymized but representative of the attributes may be generated and mapped to the sensitive data attributes. A tokenized data file may be de-tokenized and re-tokenized to perform processes that require the sensitive data attributes. A document may be transformed to protect the sensitive data attributes while reducing risk of disclosure of the sensitive data.

19 Claims, 8 Drawing Sheets

(56) References Cited

U.S. PATENT DOCUMENTS

| | | | | |
|---|---|---|---|---|
| 2021/0342842 A1* | 11/2021 | Gilbey | ............... | G06Q 20/4014 |
| 2022/0067207 A1* | 3/2022 | Lindsay | ................ | G06F 40/166 |
| 2022/0164772 A1* | 5/2022 | Fabritius | ................ | G06Q 10/10 |
| 2022/0198059 A1* | 6/2022 | Hatcher | .............. | G06F 21/6254 |

* cited by examiner

Settlement Offer

Your Settlement Offer

| STATEMENT DATE | ACCOUNT NO. | |
|---|---|---|
| 00/00/00 | 1234567 | $75.00 |

To Pay Visit
www.website.com
or call 888-888-8888

○Client

Date: 00/00/00
Original Creditor: #F04XXXXXXXXXXXXXX#
Original Acct Number: 1234567
Rev Recovery File #: 12345678
Current Balance: $100.00

120c

Dear
F02XXXXXXXXXXX#
This communication is from a debt collector. This is an attempt to collect a debt and any information obtained will be used for that purpose.

As previously advised this account has been placed with our office for collection by ABC Company. The current balance is $100.00. In an effort to assist you with resolving this matter we would like to offer you a settlement of $75.00.

Once your payment has been processed the account will be considered settled in full.

We are pleased to offer you a variety of payment methods to satisfy this account. Feel free to visit our website: www.website.com to view the available payment methods, or complete and return the payment coupon.

Sincerely,
RevSpring Collections

This collection agency is licensed by the Collection Service Board of the Department of Commerce and Insurance.

Please be advised that this is a time-barred debt and no legal action may be filed against you.

YOU HAVE OPTIONS

Notice of Collection Placement

Your account with CLIENT has been placed with us for collections. This letter serves as a request for payment of your debt. For your convenience, you may remit payment online, by mail or by phone.

You may contact our office at the toll free number below during the hours noted and speak to John Doe or an available representative.

This communication is from a debt collector. This is an attempt to collect a debt and any information obtained will be used for that purpose.

120d Your Account Information

| | |
|---|---|
| RE: | #F02XXXXXXXXXXXXX# |
| STATEMENT DATE: | 01/22/2020 |
| ACCOUNT NO: | 1-2345678 |
| CLIENT NAME: | CLIENT |
| TOTAL AMOUNT DUE: | $350.00 |

| | | |
|---|---|---|
| OPTION 1 | PAY ONLINE | Pay online at www.website.com |
| OPTION 2 | PAY BY PHONE | Pay by phone at 1-833-555-5555 |
| OPTION 3 | PAY BY MAIL | Include the remittance slip below and send to the address shown on the slip. |

OFFICE HOURS
Mon-Thur 8:00AM - 9:00PM CT
Fri 8:00AM - 5:00PM CT
Sat 8:00AM - 12:00PM CT Please detach and return lower portion with your payment. For proper credit please write 1-2345678 on your check

SENSITIVE DATA ATTRIBUTE TOKENIZATION SYSTEM

BACKGROUND

Computer technology may utilize hardware and/or software-based solutions to provide data security to protect sensitive data from unauthorized use and access. As use of a variety of devices to access sensitive data advances, it has become more and more critical to protect the sensitive material such as client details, financial details, personal details, etc. from being compromised and/or potentially misused. Once sensitive data is compromised, it may be especially difficult to remedy. In some cases, encryption may be used in attempts to secure data from unauthorized access and/or use by encrypting sensitive data on a hard disk drive. Software-based solutions may be used to encrypt the data for protection while hardware-based solutions may be used to prevent read and/or write access to sensitive data. However, each type of solution has its own limitations which may result in less than optimal protection for the sensitive data. For example, a hacker or malware may be used to circumvent a software-based solution by corrupting data files, resulting in unreadable data. Hardware-based solutions may be preferred in some cases, but may be more costly to implement and manage.

As an example, there is often a need to protect confidential or otherwise sensitive data that may be included in a document to prevent or reduce likelihood of unauthorized disclosure of the sensitive data. In some examples, secure data protection may be associated with compliance of a mandate, such as a mandate under the Fair Debt Collection Practices Act (FDCPA) relating to transmission of a consumer's personal information to a third party. Moreover, there may be a need to protect sensitive data provided to a service provider in order to maintain confidentiality of the sensitive data and also unmask the sensitive data during essential service operations performed by the service provider.

SUMMARY

Aspects of the present disclosure provide a technical improvement to data security in a third-party system by using tokens as described herein. According to an aspect, utilization of the tokenized system may allow for a third-party system to utilize anonymized but representative data associated with an individual, object, or other entity while providing third-party services and other support and data services, for example, as part of generating a document for communication to an individual. As one result, the tokenized system may provide a technical improvement to data security in a third-party system by using tokens to protect sensitive data.

In one example, a hardware-based system for protecting sensitive data comprises: at least one processor or processing device; and a memory coupled to the at least one processor, the memory including instructions that when executed by the at least one processor cause the system to: receive a data file that includes a sensitive data attribute; identify the sensitive data attribute; generate a token to anonymize and visually represent the sensitive data attribute; replace the sensitive data attribute with the token in a tokenized data file; perform a first process for generating a document using the tokenized data file; de-tokenize the sensitive data attribute; and perform a final document process for generating the document, wherein the document includes the sensitive data attribute.

In another example, a method for protecting sensitive data comprises: protecting sensitive data, comprising: receiving a data file including a sensitive data attribute; identifying the sensitive data attribute; generating a token to anonymize and visually represent the sensitive data attribute; replacing the sensitive data attribute with the token in a tokenized data file; performing a first process for generating a document using the tokenized data file; de-tokenizing the sensitive data attribute; and performing a final document process for generating the document, wherein the document includes the sensitive data attribute.

In another example, a computer readable storage device including executable instructions which, when executed by a processor, cause the processor to protecting sensitive data, the instructions comprising: receiving a data file including a sensitive data attribute; identifying the sensitive data attribute; generating a token to anonymize and visually represent the sensitive data attribute; replacing the sensitive data attribute with the token in a tokenized data file; performing a first process for generating a document using the tokenized data file; de-tokenizing the sensitive data attribute; and performing a final document process for generating the document, wherein the document includes the sensitive data attribute.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Further features, aspects, and advantages of the invention represented by the examples described in the present disclosure will become better understood by reference to the following detailed description, appended claims, and accompanying Figures, wherein elements are not to scale so as to more clearly show the details, wherein like reference numbers indicate like elements throughout the several views, and wherein:

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Figure 1:
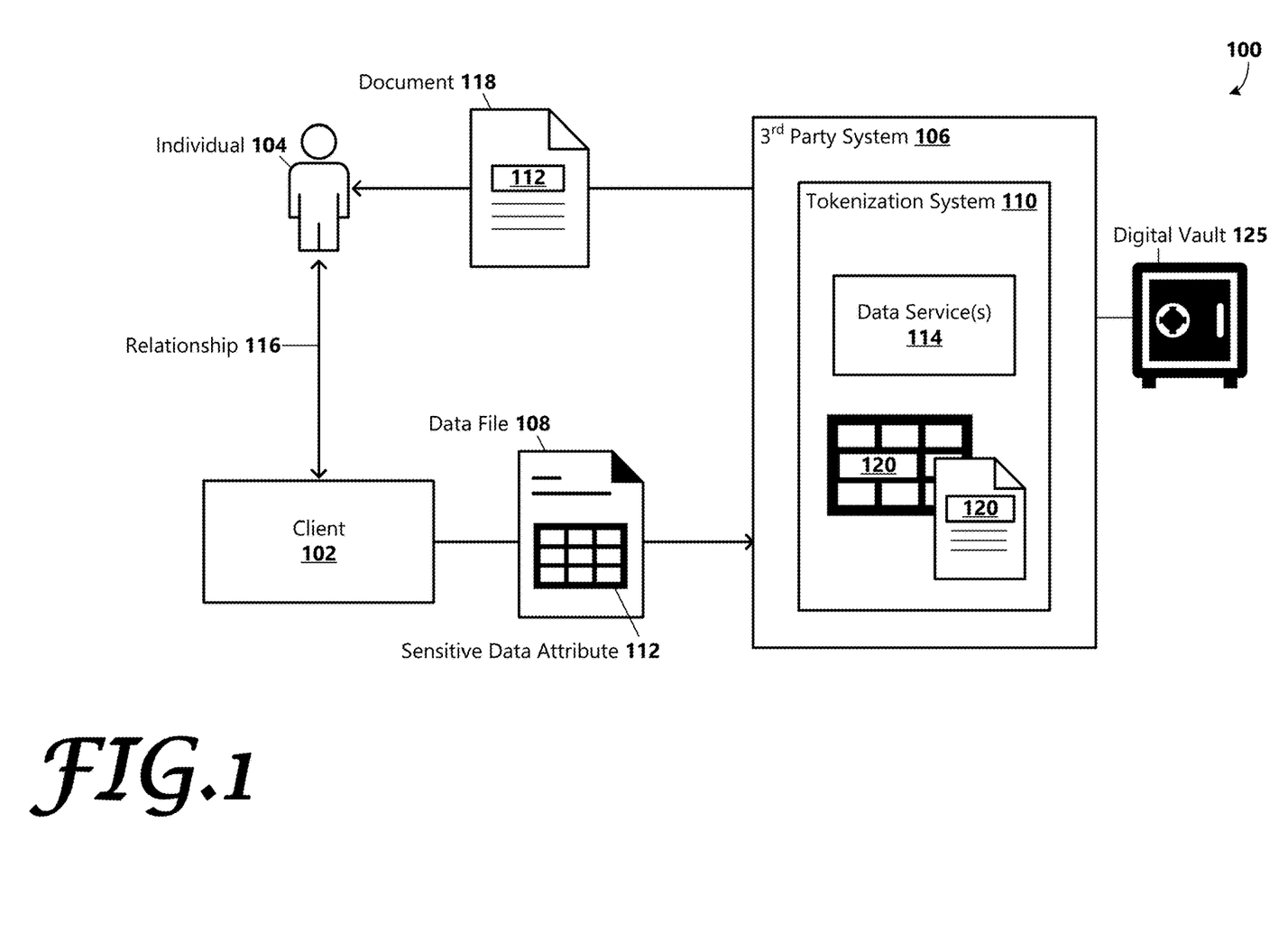
FIG. 1 illustrates an example operating environment in which various aspects of a tokenization system may operate.

Aspects of methods, systems, and computer-readable storage devices for protecting sensitive data from unauthorized disclosure while providing a service are provided herein. FIG. 1 illustrates an example operating environment 100 in which various aspects of a tokenization system 110 may operate. As illustrated, the tokenization system 110 may be included in or in communication with a third-party system 106. For example, the third-party system 106 may operate to provide a third-party service to the client 102. According to one example, the client 102 may be associated with the collection or management of sensitive data as part of performing a service. For example, a relationship 116 may be present between the client 102 and an individual 104, wherein, in some examples, the relationship 116 is a duty to perform a service associated with the individual 104 (e.g., receive or manage sensitive data associated with collection on a debt). The third-party service may provide various types of data services 114 that may be outsourced by the client 102. According to one example, the third-party system 106 may operate to provide mailing or other communication services that may be used by the client 102 to send dunning communications. According to the example, an electronic document 118, such as a dunning letter, may be generated and delivered to the individual 104 by the third-party system 106 on behalf of the client 102. As described below, the tokenization system 110 can be configured to provide a mechanism to manage and protect any sensitive data associated with the document 118 including transforming all or a portion of document 118 into a tokenized representation. As used herein, the term "document" is not limited to a particular electronic or hard-copy manifestation, but can include both electronic and non-electronic types. For example, a document can be any communication sent via print/mail or electronic, which contains a billing statement, or a letter, summary of services, reminder for an appointment, etc. Electronic communications can be in the form of e-mail, Short Message Service (SMS), Interactive Voice Response (IVR), etc. Some of the electronic messages may have a document attached (i.e., an e-mail attachment), or could contain a URL to the document on which a user can click and view on a device.

The third-party system 106 and the client 102 may include one or more computing devices and data storage devices and may be in communication with a network or a combination of networks for exchanging data and coordinating operations as part of providing the third-party service. According to an example, the document 118 may operate to convey information regarding a responsibility or obligation directly or indirectly to the individual 104, or in some examples, another person or entity, through any medium. In some examples, the individual 104 may have a computing device by which the individual 104 may receive the document 118 electronically. In other examples, the individual 104 may receive the document 118 in the form of a letter or other physical format generated by the third-party system 106.

According to an aspect, the third-party system 106 may be configured to generate the document 118 based on a data file 108 received from the client 102. The data file 108 may be one of various types of files, and in some examples, may vary by client 102. According to one example, the data file 108 may be a comma-separated values (CSV) file that uses a comma to separate values. For example, each line of the data file 108 may be a data record, and each data record may include one or more fields including a data attribute. When the data file 108 is in a CSV format, values of the data attributes may be separated by commas. In some examples, one or more of the data attributes included in the data file 108 may be a sensitive data attribute 112. According to one example, a sensitive data attribute 112 may include data that, if disclosed in connection to the relationship 116 between the client 102 and the individual 104, may be in violation of an ethics or privacy policy, guideline, mandate, law, or other regulation.

According to an aspect, the tokenization system 110 may operate to protect the sensitive data attribute 112 from an unauthorized disclosure according to one or more operations performed by the tokenized system 110 and, in some examples, operations performed by one or more data services 114. For example, the tokenization system 110 may be configured to generate and utilize a variable-length token 120 as a placeholder for the sensitive data attribute 112. For example, this may allow for processes performed by the tokenized system 110, for example, document 118 composition processes (e.g., template changes and other support functions), to accurately represent a document 118 output without displaying or otherwise revealing personal information of the individual 104. The sensitive data attribute 112 may be securely stored in a digital vault 125. For example, the digital vault 125 may include a library that may store a received sensitive data attribute 112 and return an anonymized but representative token 120, for example, for replacement of the sensitive data attribute 112 in a tokenized data file.

As mentioned above, unauthorized revealing of personal information of the individual 104 in connection with the client 102 (e.g., the relationship 116 between the individual 104 and the client 102) may be in violation of an ethics or privacy policy, guideline, mandate, law, or other regulation. Example but non-limiting sensitive data attributes 112 may include any data that is unauthorized or illegal to reveal such as an individual's name, address, phone number, email address, social security number, or other identifier that may personally identify the individual 104.

In some examples, the tokenized system 110 may further operate to use the token 120 to mask or protect the sensitive data attribute 112 of the data file 108, thus reducing risk of disclosure if the data file 108 were to be accessed internally or in the event of a security breach. Accordingly, the tokenized system 110 may provide a technical improvement to data security in a third-party system 106 by using tokens 120 as described herein. According to an aspect, utilization of the tokenized system 110 may allow for the third-party system 106 to utilize anonymized but representative data associated with an individual 104 while providing third-party services and other support and data services 114, for example, as part of generating a document 118 with any sensitive data protected for communication to the individual 104.

Figure 6:
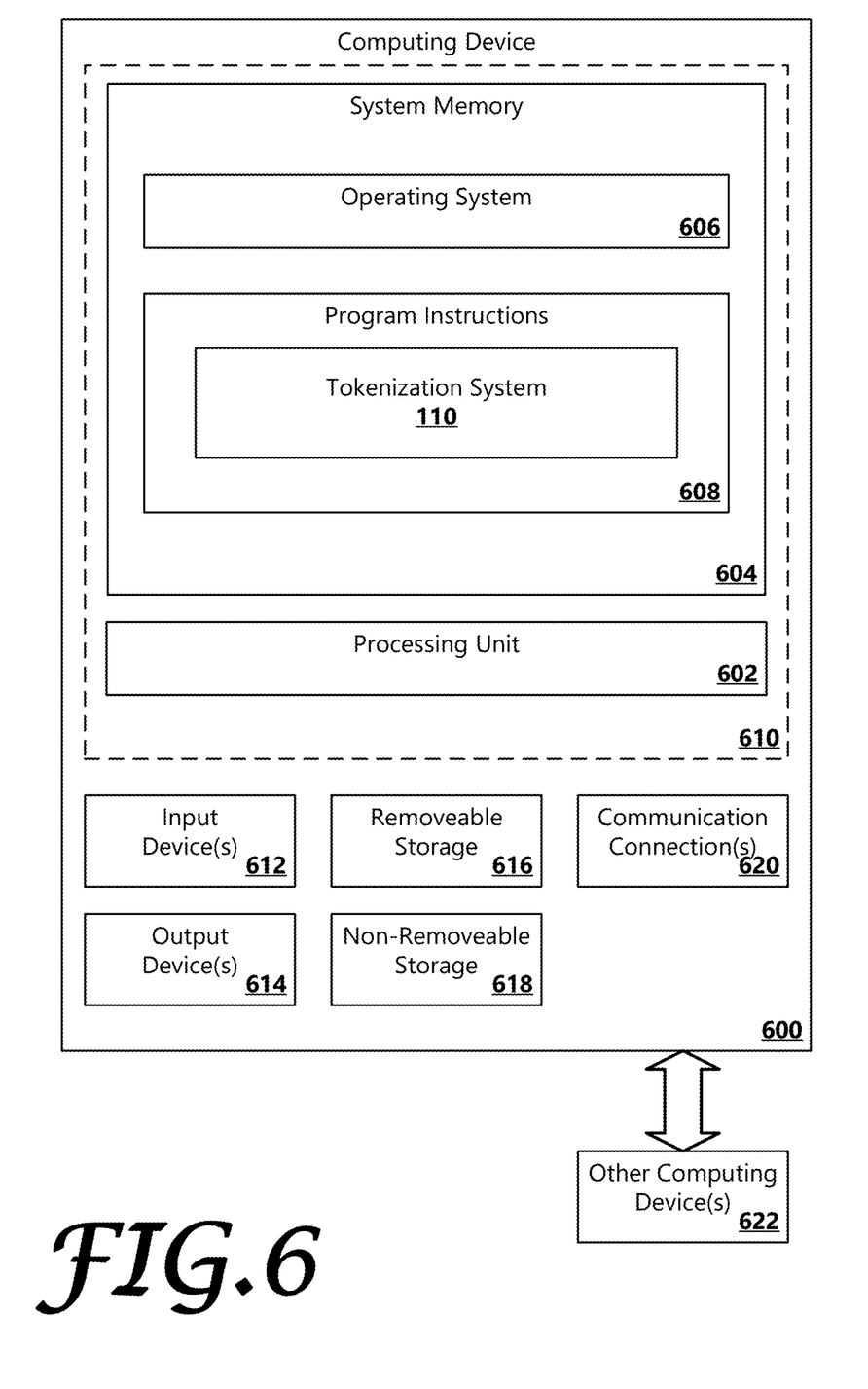
FIG. 6 is a block diagram illustrating example physical components of a computing device with which aspects of the system may be practiced.

The one or more computing devices may include a wide variety of computing devices, the hardware of which is discussed in greater detail in regard to FIG. 6. The one or more computing devices can be one of various types of computing devices. Non-limiting examples of computing devices include servers, desktop computers, laptops computers, tablets, smart phones, personal digital assistants, and distributed systems that are run on multiple computing devices. Although not illustrated, one of ordinary skill in the art will appreciate that various intermediary computing and networking devices may exist between the illustrated elements of the operating environment 100 to facilitate communications between the various enumerated elements, for example via the Internet and one or more Intranets.

Figure 2:
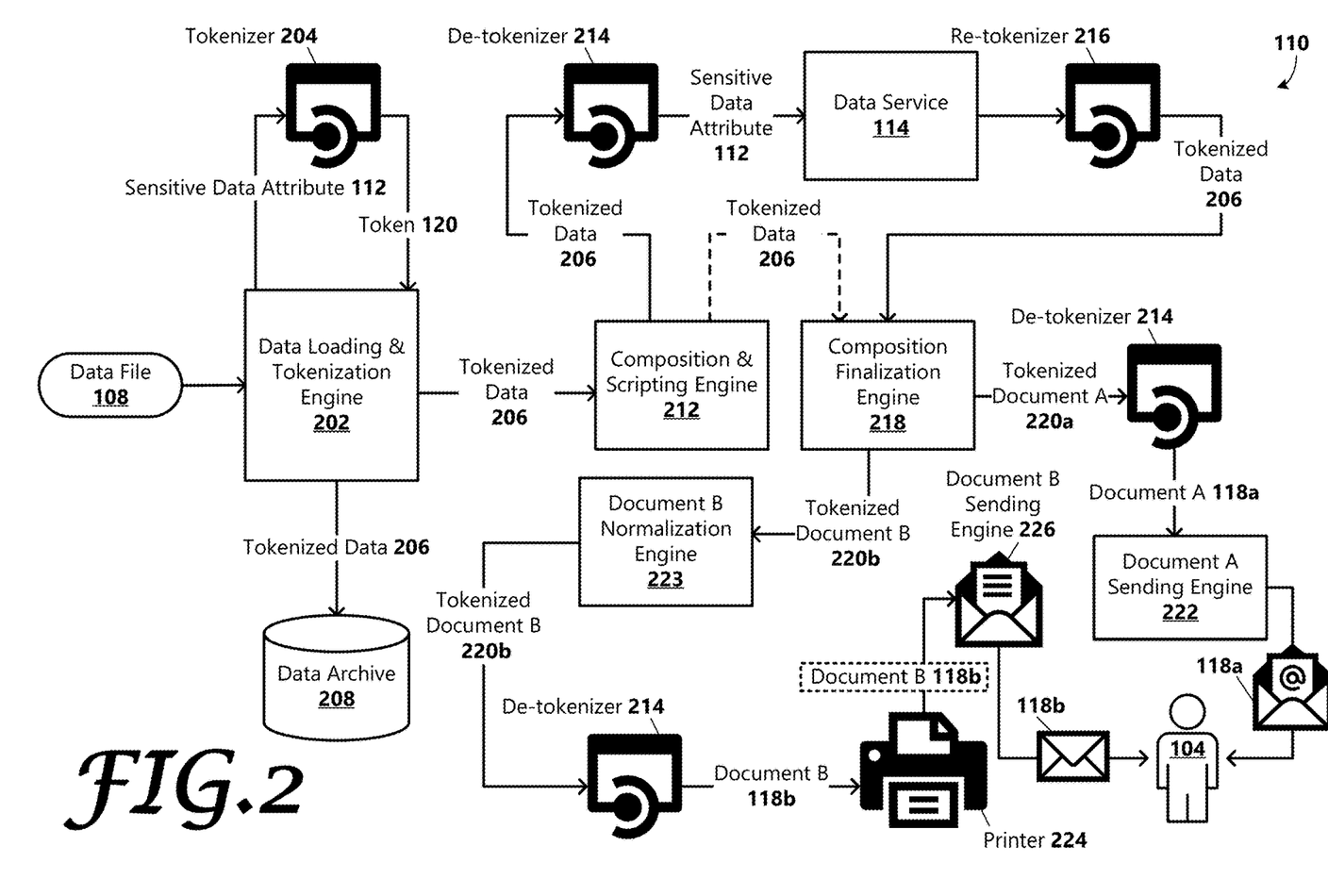
FIG. 2 illustrates components of an example tokenization system.

With reference now to FIG. 2, an example embodiment of the tokenized system 110 for improving security while maintaining usability of sensitive data is illustrated. As shown, the example tokenized system 110 may comprise a data loading and tokenization engine 202. For example, the data loading and tokenization engine 202 may be illustrative of one or more software applications, modules, or computing devices operative or configured to load a data file 108 provided by a client 102 and communicate with a tokenizer 204 to tokenize one or more sensitive data attributes 112 that may be included in the data file 108. The data file 108 may be of a file format known by the tokenization system 110 and for which types of data attributes included in the data file 108 may be predetermined. For example, one or more data attributes included in the data file 108 may be used to generate a document 118 and/or may be included in a document 118 generated by the tokenization system 110. In some examples, the data loading and tokenization engine 202 may be configured to operate in real time or near-real time to process received data files 108.

According to one example implementation, the data loading and tokenization engine 202 may be configured as a plugin, and the tokenizer 204 may be configured as an application programming interface (API). The data loading and tokenization engine 202 may be configured to identify one or more types of sensitive data attributes 112 for tokenization and make API calls to the tokenizer 204. For example, the API call may include at least one sensitive data attribute 112 extracted from the data file 108.

The tokenizer 204, in some examples, may include or be in communication with a library, herein referred to as a digital vault 125, configured to tokenize and store a received sensitive data attribute 112 and return an anonymized but representative token 120, for example, for replacement of the sensitive data attribute 112 included in data file (e.g., a data file at rest) or in a data file being processed by one or more components of the tokenization system 110 as part of generating an outbound communication. For example, the outbound communication may include a document 118 for communication to the individual 104 about a debt owed by the individual 104.

According to an aspect, the tokenizer 204 may be operative to tokenize unstructured data to generate a variable length token 120 that may replace the sensitive data attribute 112 or be overlaid on the sensitive data attribute 112. For example, the token 120 may be configured to share characteristics (e.g., character count, font type, size, spacing, and other formatting) of the particular sensitive data attribute 112 that is being masked, such that the placement or overlay of the token 120 on the sensitive data attribute 112 may allow for a useful representation of the document 118 for composition, scripting, and other processes. The token 120 may further comprise a mapping to a corresponding securely stored sensitive data attribute 112, such that the securely stored sensitive data attribute 112 can be de-tokenized when needed for execution of a process or some other operation.

In some examples, and as shown in FIG. 2, the tokenized data 206 may be stored in a data archive 208, such that if the tokenized data 206 were to be accessed internally or in a security breach while the tokenized data 206 are at rest, the corresponding sensitive data attribute 112 may remain protected, and thus the sensitive data, such as an identity of the individual 104 for example, remains unknown and protected. In some examples, tokenized data 206 comprising at least one token 120 masking at least one sensitive data attribute 112 may be further communicated to a composition and scripting engine 212. For example, the composition and scripting engine 212 is illustrative of a software application, module, or computing device operative or configured to receive tokenized data 206 and compose the document 118 to be communicated to a communication device or physically delivered to the individual 104. In some examples, the composition and scripting engine 212 may be configured to implement a template change as part of the composition process.

In some examples, one or more business rules and business logic and/or data services 114 may be implemented as part of generating the document 118. For example, the one or more data services 114 may include support, debugging, or other support functions that may be executed by the tokenization system 110. One specific example of a data service 114 may include an application for a national postal change of address service, wherein sensitive data attributes 112, such as the individual's name and address, may be required or useful as part of executing that service. According to an aspect, the tokenized data 206 associated with the required sensitive data attribute 112 may be included in an API call to a de-tokenizer 214. For example, de-tokenizer 214 may be implemented as an API configured to access the digital vault 125 where the sensitive data attribute 112 may be stored. For example, the API call to the de-tokenizer 214 may reference the token 120, which may include a mapping to the corresponding sensitive data attribute 112. According to an aspect, in a first operation after the data service 114 is executed, the sensitive data attribute 112 may be re-tokenized by a re-tokenizer 216. For example, the re-tokenizer 216 may be implemented as an API that may be in communication with the digital vault 125 and that may operate to re-tokenize the corresponding sensitive data attribute 112 after completion of the data service 114.

In some examples, the tokenization system 110 may further include a composition finalization engine 218. For examples, the composition finalization engine 218 is illustrative of a software application, module, or computing device that may be operative or configured to perform final composition operations as part of generating the document 118 for communication to a communication device or physically delivered to the individual 104. In some examples, the composition finalization engine 218 may be operative or configured to generate a file for producing a digital document (document A 118a) that may be electronically communicated to the individual 104 or a physical document (document B 118b) that may be delivered to the individual 104 by post. According to an aspect, the document generated by the composition finalization engine 218 may be represented in FIG. 2 as tokenized document A 220a or tokenized document B 220b.

As shown, an API call may be made to the de-tokenizer 214 to replace the tokens 120 in the tokenized document A 220a with their corresponding sensitive data attributes 112.

Accordingly, when the document 118 is in the form of a digital document (document A 118a), a de-tokenized document A 118a may be provided to a document A sending engine 222. For example, the document A sending engine 222 may operate to send documents 118 to individuals 104 in an electronic format, such as in an email communication, as a portable document format (PDF) document, or another document type that can be displayed on a computer screen and/or printed. That is, in some examples, the sensitive data attributes 112 may remain in a de-tokenized state until the digital document (document A 118a) is transmitted to the individual 104.

In other examples, such as when the document 118 is to be printed, the tokenized document B 220b may be provided to a document B normalization engine 223. For example, the tokenized document B 220b may be a print file, and the document B normalization engine 223 may operate to normalize the format of the print file, which may be one of different print file format types. In one example, the document B normalization engine 223 may normalize the print file into an advanced function presentation (AFP) format. Further, metadata may be added to the tokenized document B 220b, such as a document identifier (ID) that may be used by the de-tokenizer 214 as a mapping element to look up the corresponding one or more sensitive data attributes 112.

For example, and as illustrated, a call may be made to the de-tokenizer 214 to replace tokens 120 in the tokenized document B 220b with their corresponding sensitive data attributes 112 prior to being transmitted to a printer 224 to limit exposure of the sensitive data attributes 112. A document A sending engine 222 may operate to perform operations for sending the printed document B 118b to the individual 104. In one example, the document A sending engine 222 may operate to insert the printed document B 118b in an envelope to be mailed to the individual 104.

Figures 3A, 3B:
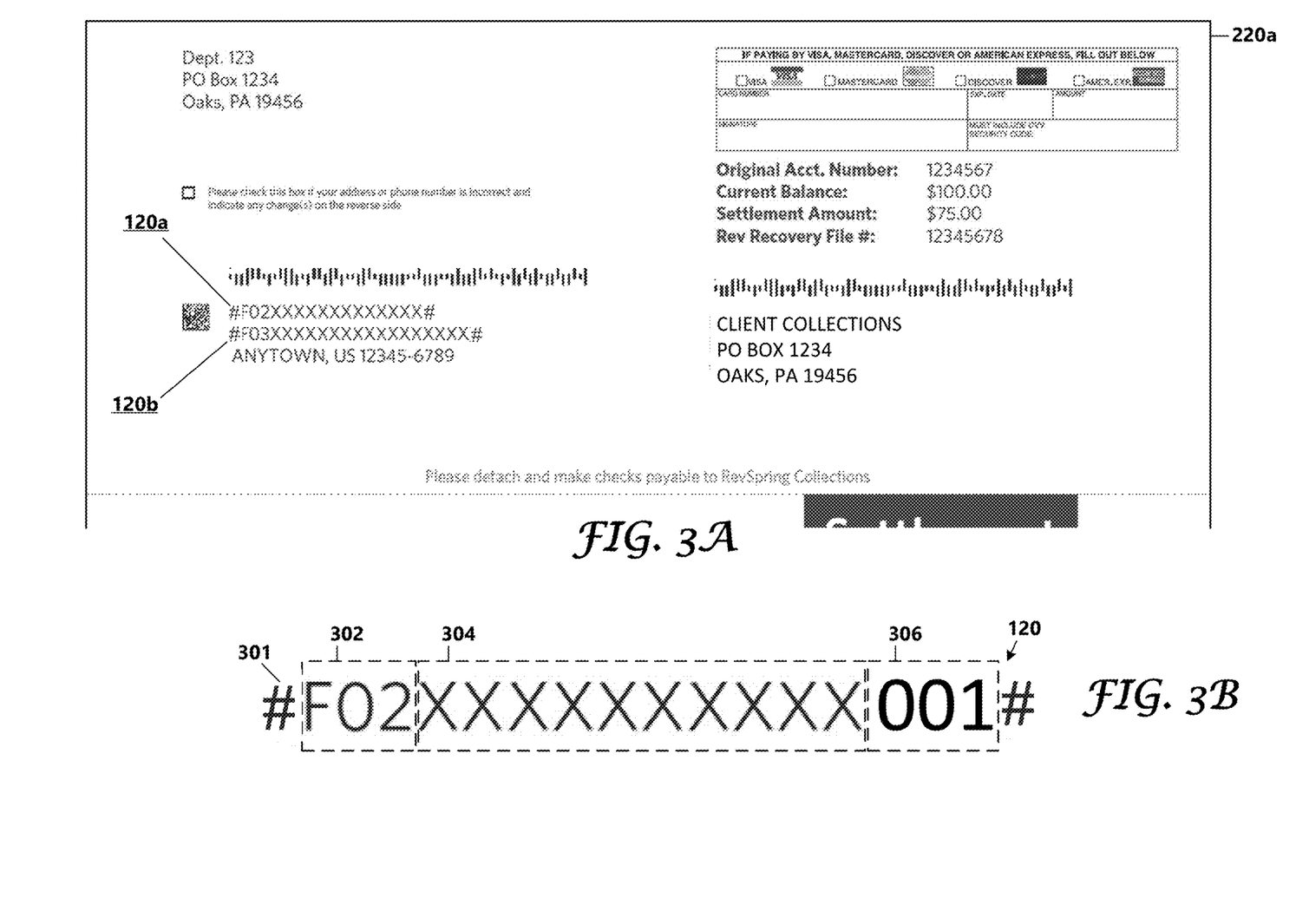
FIG. 3A illustrates a top portion of an example tokenized data file.
FIG. 3B illustrates an example token.

FIG. 3A is an illustration of a top portion of an example masked or protected document (tokenized document 220a), such as a collection letter that may be printed and mailed and/or digitally communicated to an individual 104. As shown, the tokenized document 220a includes a first token 120a masking a first sensitive data attribute 112 and a second token 120b masking a second sensitive data attribute 112. For example, the first sensitive data attribute 112 may be the individual's name, and the second sensitive data attribute 112 may be the individual's street address. As shown, the tokens 120a,b may be visually representative of the first and second sensitive data attributes 112.

With reference to FIG. 3B, an example token 120 is shown. In some examples, the token 120 may be enclosed by including opening and closing symbols or other characters 301 (e.g., the "#" character) or some other symbol or character and may include an attribute field ID 302, a variable number of padding digits 304, and a document ID 306. For example, each data file 108 and associated document 118 may have a unique ID that may be stored in the digital vault 125 in relation to the sensitive data attributes 112 that are tokenized. The document ID 306 may include at least a portion of the unique ID or a reference to the unique ID. Further, the attribute field ID 302 may correspond to an attribute field in the data file 108 that may include the sensitive data attribute 112. The attribute field ID 302 may be incremented (e.g., F01, F02, F03, etc.) for each sensitive data attribute 112 of a corresponding tokenized document or file. The attribute field ID 302 may be stored in the digital vault 125 in relation to the sensitive data attribute 112 and the token 120. In some examples, the number of padding digits 304 may be determined based on the number of characters in the sensitive data attribute 112. As should be appreciated, other patterns of tokens 120 are possible and are within the scope of the present disclosure.

As one example, the tokenization system 110 may tokenize sensitive data by incrementing the attribute field ID 302 for each sensitive data attribute 112 (wherein the number of symbols correspond to the number of characters (including spaces) in the non-tokenized data and the "#" symbol represents the start and end of tokenized data for each of the non-tokenized data):

Name: John Doe→#F01XXX#
SS#: 123-45-6789→#F02XXXXXXX#
Address: 1234 Anywhere St.→#F03XXXXXXXXXXXX#.

Figure 3C:
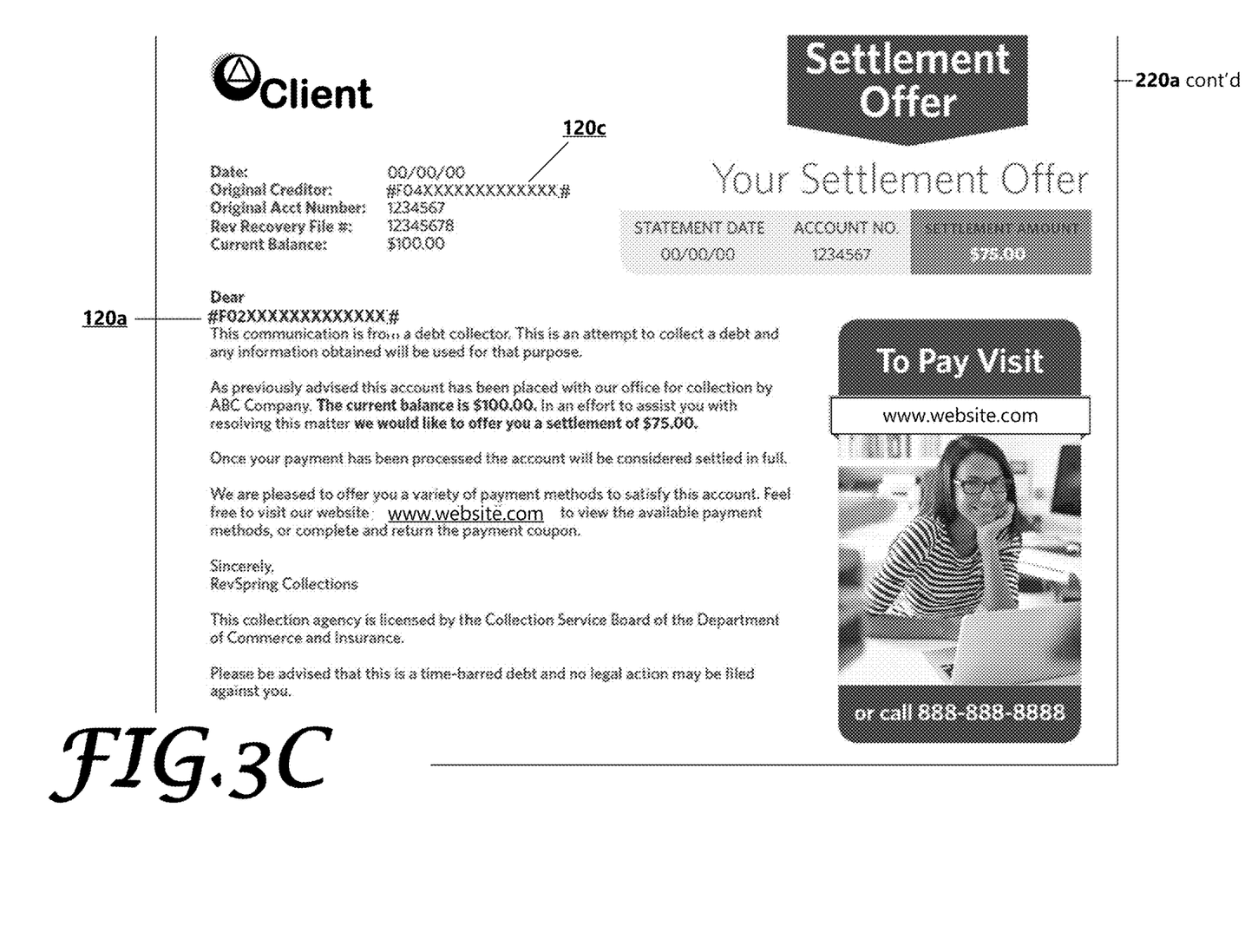
FIG. 3C illustrates a bottom portion of the example tokenized data file of FIG. 3A.

With reference now to FIG. 3C, a bottom portion of the tokenized document 220a is illustrated. For example, the bottom portion of the tokenized document 220a includes a third token 120c masking a third sensitive data attribute 112, which in the example is the name of a creditor. The first token 120a is included a second time in the tokenized document 220a to mask the individual's name.

Figure 4A:
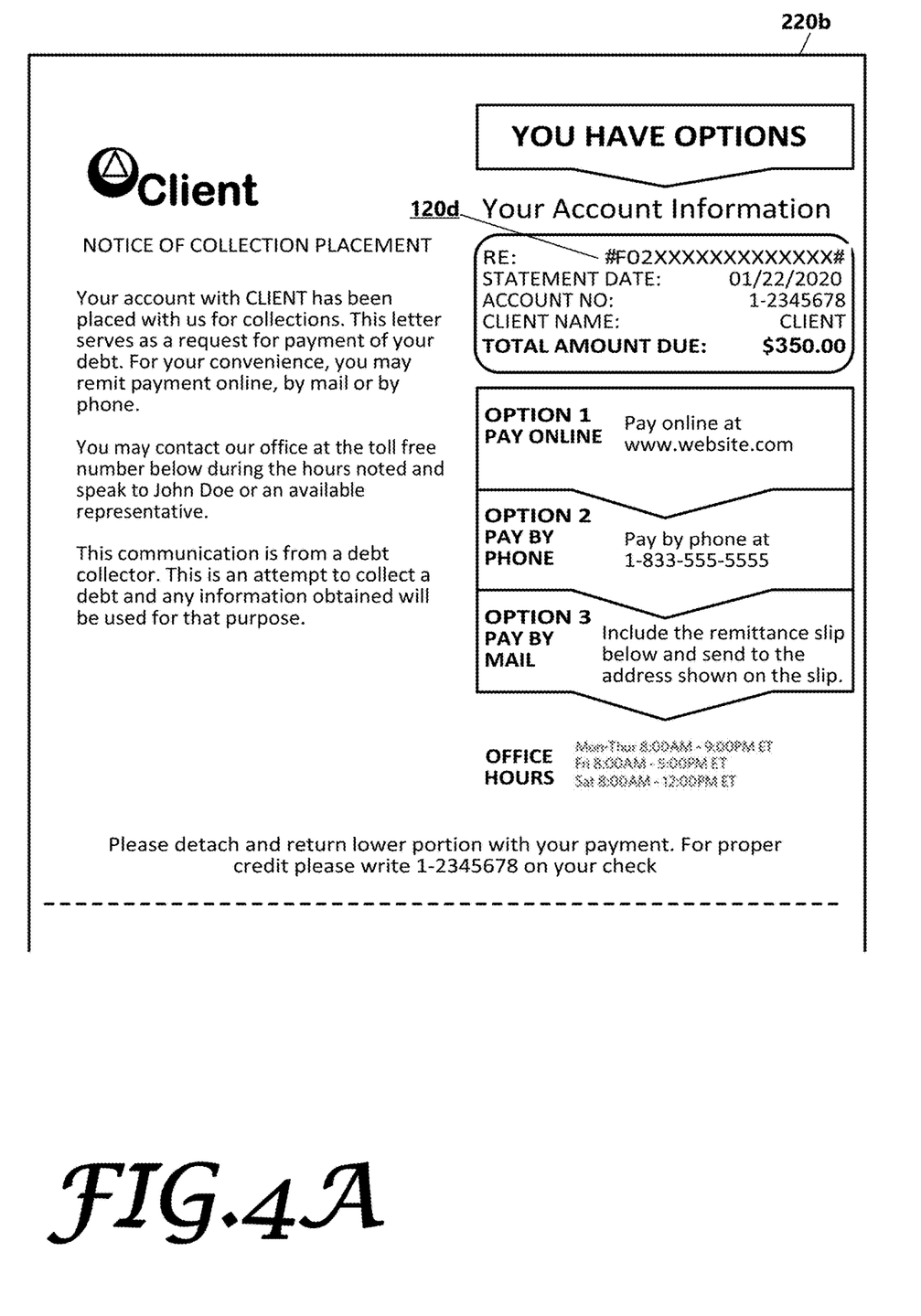
FIG. 4A illustrates a top portion of another example tokenized document.

FIG. 4A is an illustration of a top portion of an example masked document (tokenized document 220b), such as a collection placement letter that may be printed and mailed and/or digitally communicated to an individual 104. As shown, the tokenized document 220b includes a first token 120d masking a sensitive data attribute 112. For example, the sensitive data attribute 112 may be an indication of the relationship 116 between the individual 104 and the client 102, and the second sensitive data attribute 112 may be the individual's street address. As shown, the token 120d may be visually representative of the sensitive data attribute 112.

Figure 4B:
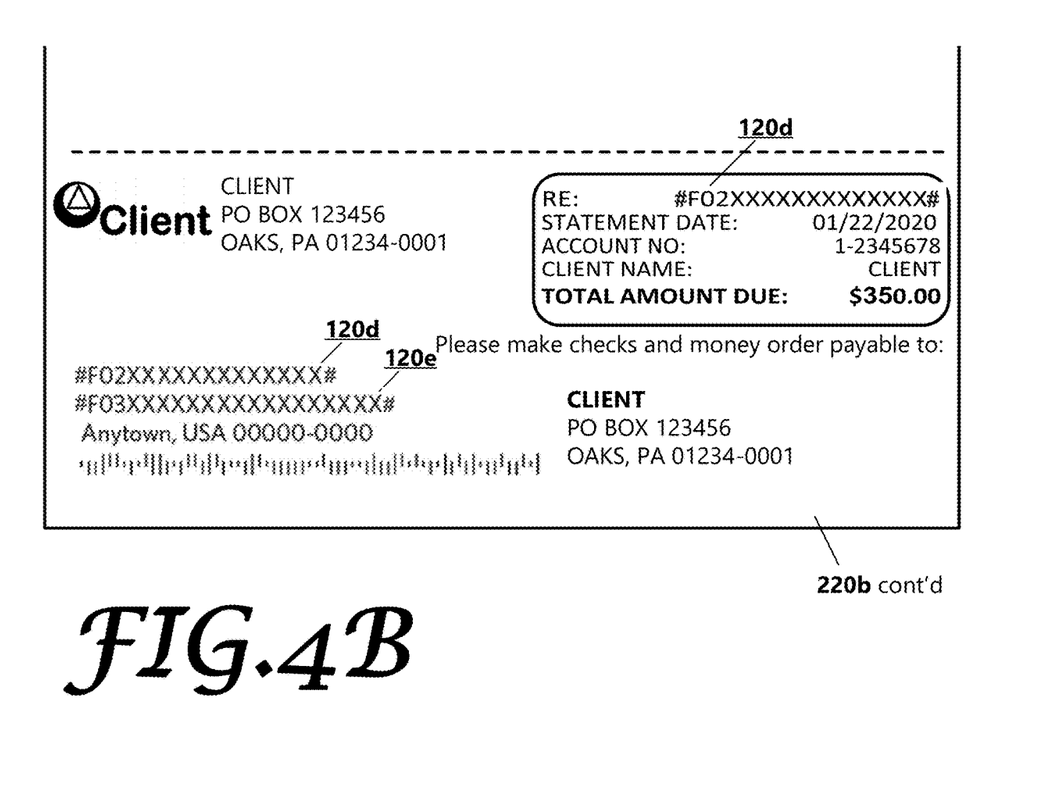
FIG. 4B illustrates a bottom portion of the example tokenized data file of FIG. 4A.

With reference now to FIG. 4B, a bottom portion of the tokenized document 220b is illustrated. For example, the bottom portion of the tokenized document 220b includes a second token 120e masking a sensitive data attribute 112, which in the example is the individual's name. The first token 220a is included a second and third time in the tokenized document 220b to mask sensitive data.

Figure 5:
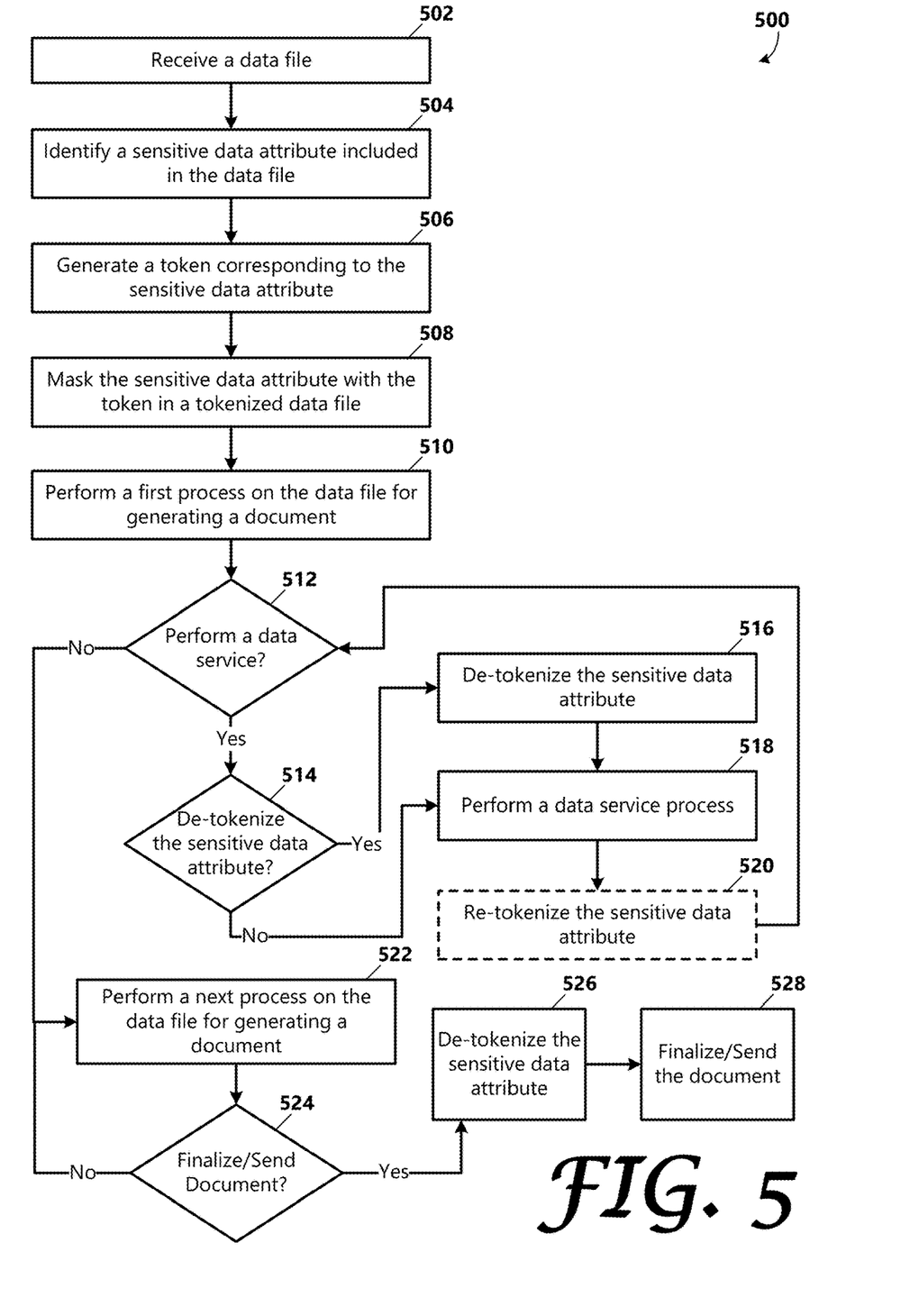
FIG. 5 is a flow chart showing general stages involved in an example method for protecting sensitive data from unauthorized disclosure.

FIG. 5 illustrates a flow chart showing general stages involved in an example method 500 for protecting sensitive data from unauthorized disclosure or access. At OPERATION 502, a data file 108 from a client system 102 may be received. For example, the data file 502 may include a data record comprising at least one data field including at least one data attribute. According to an aspect, at least one data attribute may include sensitive data and may be classified as a sensitive data attribute 112. In one example, the client system 102 may specify which data attributes may be classified as sensitive and that should be protected from unauthorized disclosure. The data attributes and sensitive data attributes 112 that may be included in the data file 108 may vary by client system 102. According to an aspect, the data attributes and sensitive data attributes 112 may include unstructured data that may vary in character length.

At OPERATION 504, a sensitive data attribute 112 may be identified in the data file 108. For example, the data loading and tokenization engine 202 may load the data attributes from the data file 108, identify the sensitive data attribute 112, and pass the sensitive data attribute 112 to a tokenizer 204 to secure the sensitive information. In some examples, the tokenizer 204 may receive the sensitive data attribute 112 and metadata about the data file 108 and sensitive data attribute 112 (e.g., the unique ID, the attribute field ID 302, character length of the sensitive data attribute 112). For example, the data loading and tokenization engine 202 may be operable to determine the character length of the sensitive data attribute 112 and include the character length in the API call to the tokenizer 204.

At OPERATION 506, a token 120 corresponding to the sensitive data attribute 112 may be generated. For example, the tokenizer 204 may generate the token 120 based on an API call. In one example, the token 120 may include a document ID 306 referencing the unique ID, an attribute field ID 302 referencing the attribute field of the sensitive data attribute 112, and a variable number of padding digits 304 to pad the token 120 to be the same character length as the sensitive data attribute 112. The sensitive data attribute 112 may be securely stored in the digital vault 125 in relation to the unique (document) ID and the attribute field.

At OPERATION 508, the sensitive data attribute 112 may overlaid or replaced by the generated token 120. For example, tokenized data 206 may be stored in a data archive 208 and may be further passed to a first process for generating a communication output (i.e., document 118) associated with and directed to the individual 104.

At OPERATION 510, the first process may be executed. In some examples, the first process may include one or more composition and scripting operations based on business rules and business logic in association with generating the document 118.

At DECISION OPERATION 512, a determination may be made as to whether a data service 114 may need to be performed in relation to the document 118. The data service 114, for example, may be implemented as part of generating the document 118. For example, one or more data services 114 may include support, debugging, or other functions that may be executed by the tokenization system 110. When a determination is made that a data service may be executed, at DECISION OPERATION 514, a determination may be made as to whether a token 120 in a tokenized data file 210 may need to be de-tokenized. For example, when the sensitive data attribute 112 is required for execution of the data service 114, the sensitive data attribute 112 may be de-tokenized at OPERATION 516. For example, the token 120 may be mapped to its corresponding sensitive data attribute 112 based on the document ID 306 referencing the unique (document) ID and the attribute field ID 302 referencing the attribute field of the sensitive data attribute 112.

The data service 114 may be executed at OPERATION 518, and the sensitive data attribute may be immediately re-tokenized at OPERATION 520. The process may return to DECISION OPERATION 512. When a determination is made at DECISION OPERATION 512 that a data service 114 may not need to be performed, the method 500 may proceed to OPERATION 522, where a next process may be executed. In some examples, the next process may include one or more final composition operations for generating the document 118.

At DECISION OPERATION 524, a determination may be made as to whether to perform a final operation in association with generating the document 118, for example, for electronically sending or printing, inserting, and mailing the document 118. When a determination is made to perform the final operation, the token 120 may be replaced with the sensitive data attribute 112 at OPERATION 526. The document 118 may then be electronically sent or printed, inserted in an envelope, and mailed to the individual 104 at OPERATION 528.

FIG. 6 is a block diagram illustrating physical components of an example computing device with which aspects may be practiced. The computing device 600 may include at least one processing unit 602 and a system memory 604. The system memory 604 may comprise, but is not limited to, volatile (e.g., random access memory (RAM)), non-volatile (e.g., read-only memory (ROM)), flash memory, or any combination thereof. System memory 604 may include operating system 606, one or more program instructions 608, and may include sufficient computer-executable instructions for the tokenization system 110, which when executed, perform functionalities as described herein. Operating system 606, for example, may be suitable for controlling the operation of computing device 600. Furthermore, aspects may be practiced in conjunction with a graphics library, other operating systems, or any other application program and is not limited to any particular application or system. This basic configuration is illustrated by those components within a dashed line 610. Computing device 600 may also include one or more input device(s) 612 (keyboard, mouse, pen, touch input device, etc.) and one or more output device(s) 614 (e.g., display, speakers, a printer, etc.).

The computing device 600 may also include additional data storage devices (removable or non-removable) such as, for example, magnetic disks, optical disks, or tape. Such additional storage is illustrated by a removable storage 616 and a non-removable storage 618. Computing device 600 may also contain a communication connection 620 that may allow computing device 600 to communicate with other computing devices 622, such as over a network in a distributed computing environment, for example, an intranet or the Internet. Communication connection 620 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 600 or any other computing devices 622, in combination with computing device 600, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for protecting sensitive data, the system comprising:
at least one processing device;
at least one computer readable data storage device storing instructions that, when executed by the at least one processing device, cause the system to:
receive a data file including a sensitive data attribute;
identify the sensitive data attribute;
generate a token to anonymize and visually represent the sensitive data attribute;
replace the sensitive data attribute with the token in a tokenized data file;
perform a document composition process for composing a document using the tokenized data file, wherein the document composition process comprises to:
determine whether the sensitive data attribute is required for execution of a data service in relation to the document composition process;
in response to the determination that the sensitive data attribute is required for execution of the data service;
de-tokenize the sensitive data attribute;
use the sensitive data attribute in executing the data service as part of the document composition process; and
re-tokenize the sensitive data attribute using the token, thereby resulting in a re-tokenized sensitive data attribute;
de-tokenize the re-tokenized sensitive data attribute; and
perform a final document process for generating the document, wherein the document includes the sensitive data attribute;
a tokenizer operable to tokenize the sensitive data attribute;
a de-tokenizer operable to de-tokenize the sensitive data attribute;
a data loading and tokenization engine operable to load the data file and communicate with the tokenizer;
a composition and scripting engine operable to receive tokenized data, call the de-tokenizer, and compose the document; and
a composition and finalization engine operable to perform final composition operations as part of generating the document for communication to a communication device or to be physically delivered.

2. The system of claim 1, wherein the sensitive data attribute is stored in a digital vault and includes a mapping to:
the data file;
an attribute field in the data file that includes the sensitive data attribute; and
the token.

3. The system of claim 2, wherein the token comprises:
a document identifier corresponding to the data file; and
an attribute field identifier corresponding to the attribute field.

4. The system of claim 1, wherein the sensitive data attribute includes unstructured data.

5. The system of claim 4, wherein the token comprises a same number of characters as the sensitive data attribute.

6. The system of claim 1, wherein in performing the final document process, the system is operative to:
generate an electronic document; and
send the electronic document to an individual.

7. The system of claim 1, wherein in performing the final document process, the system is operative to:
print the document;
insert the printed document in an envelope; and
mail the printed document to an individual.

8. A method for protecting sensitive data, the method comprising:
receiving, by a data loading and tokenization engine, a data file including a sensitive data attribute;

identifying, by the data loading and tokenization engine, the sensitive data attribute;

generating, by a tokenizer, a token to anonymize and visually represent the sensitive data attribute;

replacing, by the tokenizer, the sensitive data attribute with the token in a tokenized data file;

performing, by a composition and scripting engine, a document composition process for composing a document using the tokenized data file, wherein the document composition process comprises:

determining, by the composition and scripting engine, whether the sensitive data attribute is required for execution of a data service in relation to the document composition process;

in response to the determination that the sensitive data attribute is required for execution of the data service;

de-tokenizing, by a de-tokenizer, the sensitive data attribute;

using, by the composition and scripting engine, the sensitive data attribute in executing the data service as part of the document composition process; and re-tokenizing, by the tokenizer, the sensitive data attribute using the token, thereby resulting in a re-tokenized sensitive data attribute;

de-tokenizing, by the de-tokenizer, the re-tokenized sensitive data attribute; and performing, by a composition and finalization engine, a final document process, wherein the document includes the sensitive data attribute.

9. The method of claim 8, further comprising: storing the sensitive data attribute in a digital vault including a mapping to:

the data file;

an attribute field in the data file that includes the sensitive data attribute; and the token.

10. The method of claim 9, wherein generating the token comprises including, in the token, a document identifier corresponding to the data file and an attribute field identifier corresponding to the attribute field.

11. The method of claim 9, wherein generating the token comprises generating the token for unstructured data.

12. The method of claim 11, wherein generating the token comprises generating the token with a same number of characters as the sensitive data attribute.

13. The method of claim 8, wherein performing the final document process comprises:

generating an electronic document; and sending the electronic document to the individual.

14. The method of claim 8, wherein performing the final document process comprises:

printing the document;

inserting the printed document in an envelope; and mailing the printed document to an individual.

15. A computer readable storage device that includes executable instructions which, when executed by a processor, cause the processor to:

receive, by a data loading and tokenization engine, a data file including a sensitive data attribute;

identify, by the data loading and tokenization engine, the sensitive data attribute;

generate, by a tokenizer, a token to anonymize and visually represent the sensitive data attribute;

replace, by the tokenizer, the sensitive data attribute with the token in a tokenized data file;

perform, by a composition and scripting engine, a document composition process for composing a document using the tokenized data file, wherein the document composition process comprises:

determine, by the composition and scripting engine, whether the sensitive data attribute is required for execution of a data service in relation to the document composition process;

in response to the determination that the sensitive data attribute is required for execution of the data service;

de-tokenize, by a de-tokenizer, the sensitive data attribute;

use, by the composition and scripting engine, the sensitive data attribute in executing the data service as part of the document composition process; and re-tokenize, by the tokenizer, the sensitive data attribute using the token, thereby resulting in a re-tokenized sensitive data attribute;

de-tokenize, by the de-tokenizer, the re-tokenized sensitive data attribute; and perform, by a composition and finalization engine, a final document process, wherein the document includes the sensitive data attribute.

16. The computer readable storage device of claim 15, wherein to generate the token comprises to:

include, in the token, a document identifier corresponding to the data file and an attribute field identifier corresponding to the attribute field;

generate the token for unstructured data; and generate the token with a same number of characters as the sensitive data attribute.

17. The computer readable storage device of claim 15, wherein to perform the final document process comprises to:

generate an electronic document; and send the electronic document to the individual; or printing the document;

inserting the printed document in an envelope; and mailing the printed document to an individual.

18. The system of claim 1, wherein to re-tokenize the sensitive data attribute includes to use an API to access a digital vault that stores the sensitive data attribute.

19. The method of claim 8, wherein re-tokenizing the sensitive data attribute includes using an API to access a digital vault that stores the sensitive data attribute.

* * * * *